March 7, 1944. B. S. McLAUGHLIN, JR., ET AL 2,343,785

TAPER PREVENTING PHOTOELECTRIC CELL DEVICE

Filed Feb. 10, 1943

INVENTORS
Bernard S. McLaughlin, Jr.
Jack Henry Zyerveld
BY
ATTORNEY

Patented Mar. 7, 1944

2,343,785

UNITED STATES PATENT OFFICE 2,343,785

TAPER PREVENTING PHOTOELECTRIC
CELL DEVICE

Bernard S. McLaughlin, Jr., Brooklyn, N. Y., and
Jack Henry Zyerveld, Chester, Pa.

Application February 10, 1943, Serial No. 475,378

5 Claims. (Cl. 33—46)

This invention relates to new and useful improvements in a taper preventing photoelectric cell device.

More specificallly, the invention proposes the construction of a taper preventing photoelectric cell device to be used in combination with the tailstock and headstock of a lathe or other similar machine tool in a manner to facilitate determining when the centers of the tailstock and headstock are in a direct line with each other.

Still further it is proposed to characterize the taper preventing photoelectric cell device by an exciter lamp mounted upon the machine tool in the vicinity of the headstock with a photoelectric cell controlled switch mounted on the machine in the vicinity of the tailstock so that rays of light from the exciter lamp will be directed towards the photoelectric cell controlled switch to control the illumination of an indicating lamp when the rays of light from the exciter lamp contact the photoelectric cell controlled switch.

Another object of the invention proposes the provision of a member having recessed points to be mounted between the centers of the headstock and tailstock and provided with an aperture true to a parallel line with the centers of the tailstock and headstock so that when the centers are directly in alignment a ray of light will pass through the aperture from the exciter lamp to the photoelectric cell controlled switch for the purpose hereinbefore outlined.

Still further it is proposed to provide the member with a plurality of other apertures varying to the right and left of a true parallel line between the centers of the headstock and tailstock and which are adapted to be brought selectively into position between the exciter lamp and photoelectric cell controlled switch by rotating the member to find the aperture through which rays of light will pass from the exciter lamp to the photoelectric cell controlled switch in a manner to determine the degree at which the centers of the tailstock and headstock vary from true alignment.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
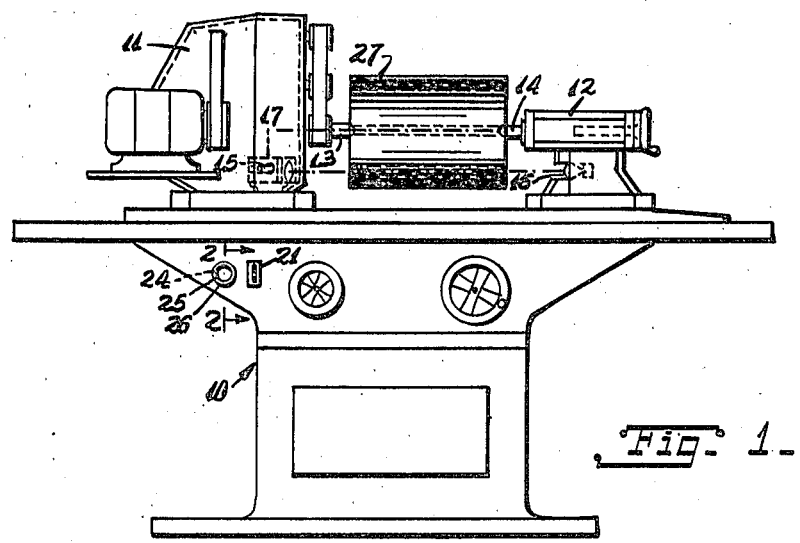
Fig. 1 is a front elevational view of a grinding machine having a taper preventing photoelectric cell device constructed in accordance with this invention.
Figure 2:
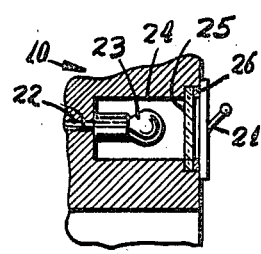
Fig. 2 is an enlarged partial vertical sectional view taken on the line 2—2 of Fig. 1.
Figure 3:
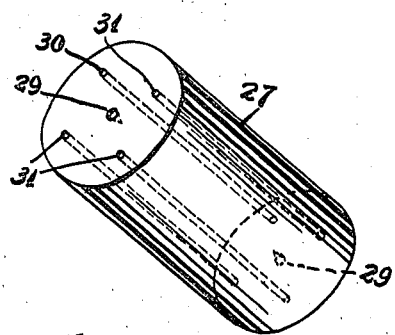
Fig. 3 is a perspective view of the test member, per se.

The taper preventing photoelectric cell, according to this invention, is to be used on a grinding machine 10 having a headstock 11 and a tailstock 12. The headstock 11 is provided with a driven center 13 and the tailstock 12 is provided with a center 14. The operative portions of the taper preventing photoelectric cell are mounted on the headstock 11 and tailstock 12 to determine when the centers 13 and 14 are in true alignment with each other so as to rotate work placed in the grinding machine without wobbling.

The taper preventing photoelectric cell device is characterized by an exciter lamp 15 mounted upon the headstock 11 and a photoelectric cell controlled switch 16 mounted upon the tailstock 12. The exciter lamp 15 is mounted within a small container 17 secured to a portion of the headstock 11 and which is provided with an open front 18 across which a lens 19 is mounted.

Rays of light from the exciter lamp 15 are adapted to pass through the lens 19 and opening 18 to be concentrated upon the photoelectric cell controlled switch 16 by means of the lens 19.

Figure 4:
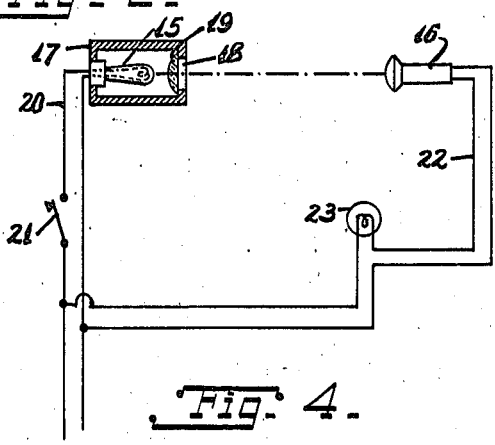
Fig. 4 is a schematic wiring diagram of the device.

As shown in Fig. 4 the exciter lamp 15 is mounted in a circuit 20 which includes a source of power and a switch 21. The switch 21 is mounted upon a convenient portion of the grinder 10 at the front thereof to be controlled by the operator to close the circuit 20 and supply the required current to illuminate the exciter lamp 15. The photoelectric cell controlled switch 16 is mounted in a second circuit 22 which includes a source of power and an indicating lamp 23. The indicating lamp 23 is mounted within a hollow 24 formed on a portion of the body of the grinder 10 adjacent the switch 21. The circuit 22 is so arranged that when the photoelectric cell controlled switch 16 is actuated by rays of light from the exciter lamp 15 the bulb 23 will be illuminated to indicate that the centers 13 and 14 are in a direct line with each other. The open front of the hollow 24 which contains the indicating bulb 23 is closed by a plate of glass 25 which is held in position by a removable ring 26.

A member 27 constructed of wood or other similar material is provided at its ends with centrally located recessed points 29 which are adapted to be engaged by the centers 13 and 14 of the headstock 11 and tailstock 12. Thus the member 27 is rotatively supported by these centers to be turned. The member 27 is provided with an aperture 30 which is true and parallel to a direct center between a correctly aligned position of the centers 13 and 14.

This aperture 30 extends completely through the member 27 from one end to the other and is adapted to be brought into position between the exciter lamp 15 and photoelectric cell controlled switch 16 so that rays of light will pass though this aperture 30 to contact the photoelectric controlled switch to actuate the same and light the indicating bulb 23 only in correctly aligned position of the centers 13 and 14. The member 27 is also provided with a plurality of other apertures 31 arranged concentric with the aperture 30 about the recessed points 29. These other apertures 31 also extend completely through the member 27 and vary slightly to the right and left of a true and central parallel center between a perfectly aligned position of the centers 13 and 14. If it is found that the rays of light from the exciter lamp 15 will not contact the photoelectric controlled switch 16 when the true aperture 30 is in position between these elements it is merely necessary to rotate the member 27 and selectively bring the other apertures 31 into position between the elements 15 and 16. When an opening is found through which the rays of light will pass to contact the photoelectric cell controlled switch 16 it can be easily determined the degree to which the centers 13 and 14 vary from a truly aligned position, permitting either of the stocks 11 or 12 to be adjusted to bring the centers 13 and 14 into proper alignment so that the rays of light from the exciter lamp 15 will pass through the true aperture 30 and contact the photoelectric cell controlled switch 16 to illuminate the indicating bulb 23.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In combination with the tailstock and headstock of a lathe or other machine tool, an exciter lamp mounted on said machine tool in the vicinity of said headstock, a photoelectric cell controlled switch mounted on said machine tool in the vicinity of said tailstock, said exciter lamp and photoelectric cell being identically positioned with respect to the headstock and tailstock, and a member with recessed points for mounting between said tailstock and headstock and having an aperture parallel with the line determined by said points and controlling the passage of a beam of light from said exciter lamp to said photoelectric cell switch.

2. In combination with the tailstock and headstock of a lathe or other machine tool, an exciter lamp mounted on said machine tool in the vicinity of said headstock, a photoelectric cell controlled switch mounted on said machine tool in the vicinity of said tailstock, said exciter lamp and photoelectric cell being identically positioned with respect to the headstock and tailstock, and a member with recessed points for mounting between said tailstock and headstock and having an aperture parallel with the line determined by said points and controlling the passage of a beam of light from said exciter lamp to said photoelectric cell switch, said exciter lamp being mounted within a container having an open front end closed by a lens for converging the rays of light from said exciter lamp upon said photoelectric cell controlled switch.

3. In combination with the tailstock and headstock of a lathe or other machine tool, an exciter lamp mounted on said machine tool in the vicinity of said headstock, a photoelectric cell controlled switch mounted on said machine tool in the vicinity of said tailstock, said exciter lamp and photoelectric cell being identically positioned with respect to the headstock and tailstock, and a member with recessed points for mounting between said tailstock and headstock and having an aperture parallel with the line determined by said points and controlling the passage of a beam of light from said exciter lamp to said photoelectric cell switch, said exciter lamp being mounted in a circuit including a switch adapted to be closed for completing the circuit to illuminate said exciter lamp.

4. In combination with the tailstock and headstock of a lathe or other machine tool, an exciter lamp mounted on said machine tool in the vicinity of said headstock, a photoelectric cell controlled switch mounted on said machine tool in the vicinity of said tailstock, said exciter lamp and photoelectric cell being identically positioned with respect to the headstock and tailstock, and a member with recessed points for mounting between said tailstock and headstock and having an aperture parallel with the line determined by said points and controlling the passage of a beam of light from said exciter lamp to said photoelectric cell switch, said photoelectric cell controlled switch being mounted in a circuit including an indicating bulb adapted to be illuminated when said photoelectric cell controlled switch is acted upon by rays of light from said exciter lamp.

5. In combination with the tailstock and headstock of a lathe or other machine tool, an exciter lamp mounted on said machine tool in the vicinity of said headstock, a photoelectric cell controlled switch mounted on said machine tool in the vicinity of said tailstock, said exciter lamp and photoelectric cell being identically positioned with respect to the headstock and tailstock, and a member with recessed points for mounting between said tailstock and headstock and having an aperture parallel with the line determined by said points and controlling the passage of a beam of light from said exciter lamp to said photoelectric cell switch, said member being provided with a plurality of other apertures which vary from a true and parallel line between said centers to determine the degree to which the tailstock and headstock vary from a true parallel.

BERNARD S. McLAUGHLIN, Jr.
JACK HENRY ZYERVELD.